Figure 1:
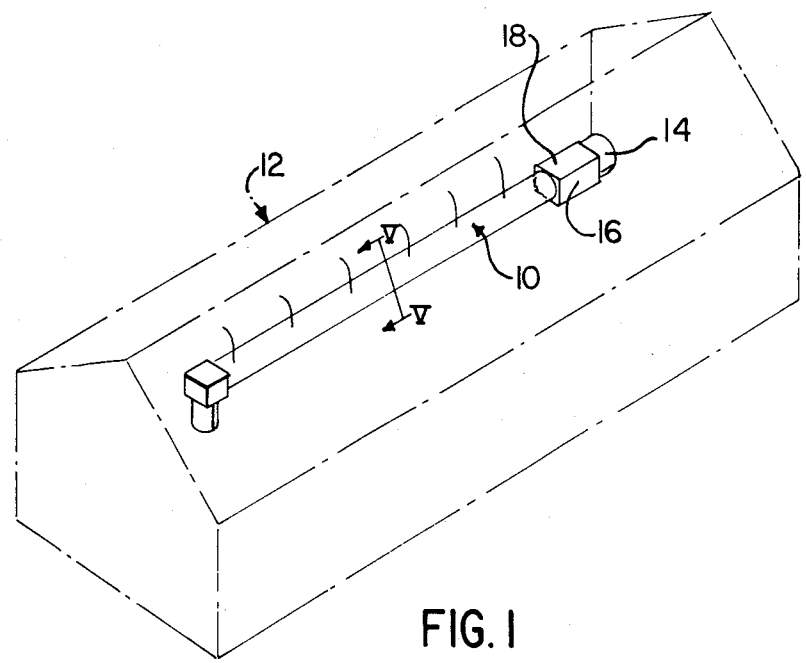

United States Patent [19]

Brundrett et al.

[11] Patent Number: 4,616,696

[45] Date of Patent: Oct. 14, 1986

[54] EXHAUST AIR HEAT EXCHANGER

[75] Inventors: Ewart Brundrett; Laurence Brundrett, both of Baden, Canada

[73] Assignee: Canadian Patents and Development Limited, Ottawa, Canada

[21] Appl. No.: 639,408

[22] Filed: Aug. 10, 1984

[51] Int. Cl.⁴ .......................... F24H 3/02; F24F 7/10
[52] U.S. Cl. ....................................... 165/54; 165/46; 165/905; 98/33.1; 98/40.19; 47/17
[58] Field of Search .................. 165/54, 901, 909, 905; 98/40.19, 33.1; 34/86; 47/17

[56] References Cited

U.S. PATENT DOCUMENTS 3,949,522  4/1976  Kehl et al. ..................... 98/40.19

FOREIGN PATENT DOCUMENTS

| 0086175 | 8/1983  | European Pat. Off. | 165/54 |
| 2556630 | 6/1977  | Fed. Rep. of Germany | 165/54 |
| 3017431 | 11/1981 | Fed. Rep. of Germany | 165/54 |
| 3313936 | 12/1983 | Fed. Rep. of Germany | 165/54 |
| 0117247 | 10/1978 | Japan | 165/54 |
| 0109731 | 6/1984  | Japan | 165/54 |
| 0577387 | 10/1977 | U.S.S.R. | 165/46 |
| 0981811 | 12/1982 | U.S.S.R. | 165/54 |

OTHER PUBLICATIONS

Shurcliff, "Air-to-Air Heat Exchangers for Homes", Brick House Publishing Co, Mass., 1982, pp. 157–158.

Primary Examiner—William R. Cline
Assistant Examiner—John K. Ford

[57] ABSTRACT

A heat exchanger for exchanging heat between incoming cold fresh air and outgoing warm exhaust air. The heat exchanger is constructed of a number of relatively long flexible plastic tubes supported within a flexible plastic outer housing. The inner tubes are supported in spaced-apart relationship within the outer housing. A manifold on each end of the tubes in sealing engagement with the inner tubes and with the housing so that air can be forced through the inner tubes in one direction and through the housing in the other direction. The diameters of the inner tubes and outer housing being large enough so that blockage by ice or frost is minimized.

3 Claims, 6 Drawing Figures

HEAT EXCHANGER EFFECTIVENESS vs FLOW RATE AND LENGTH FOR SINGLE AND SEVEN TUBE-IN-SHELL DESIGN

EXHAUST AIR HEAT EXCHANGER

This invention relates to heat exchangers and more particularly to a heat exchanger for extracting heat from exhaust air leaving a structure.

The heat exchanger of this invention is particularly suited for high volumetric flow exchange of heat between outgoing exhaust air and incoming ventilation air in greenhouses.

Ventilation required in greenhouses, according to the present practice, is provided by opening and closing louvres or the like resulting in considerable heat loss, thereby increasing heat costs.

The reduction of passive infiltration of air into greenhouses from three or more air changes per hour to changes of one-half or less had led to significant changes in heating costs. However, this is often detrimental to the crops being grown. The very low air exchange rates can lead to abnormally high levels of humidity both during the daytime and at night, as well as leading to abnormally high levels of toxic gases resulting from $CO_2$ addition by combustion.

It has been found that some of these problems can be partially resolved by the use of heat exchangers constructed of thin plastic film for providing a low cost method of extracting heat from greenhouse exhaust air. The recovered heat is used to warm incoming fresh air thereby reducing ventilation heat demands. Simple two tube counter flow heat exchangers were tested but were found to require extra long lengths to provide adequate heat exchange. A more compact type consisting of multiple tubes of large diameter within an outer shell was found to provide a thermal effectiveness of up to 70% for lengths of 30 m.

The added advantage is that condensation occurring within the heat exchanger can be directed to collection points. If icing occurs on the outer surface of the inner tubes near the cold end, it tends to be self-limiting in thickness and does not significantly influence the flow of exhaust air over the inner tubes. It is, therefore, an object of this invention to provide an efficient low cost heat exchanger to replace high energy loss ventilation systems.

It is a further object of this invention to provide a heat exchanger which requires little, if any, defrosting thereby conserving the heat lost in the defrost cycle of conventional heat exchangers.

A further object is the provision of a heat exchanger which can be assembled from low cost materials by the greenhouse operator and easily maintained or repaired.

A still further object of the invention is the provision of large diameter inner tubes and a large diameter outer housing combined with greater length for good thermal effectiveness.

Accordingly, the present invention provides an apparatus for use in exchanging heat between incoming and outgoing air in a greenhouse, said apparatus comprising a plurality of elongated inner tubes of thin walled plastic, an elongated housing of thin walled flexible plastic enclosing said inner tubes, means for supporting said inner tubes in a selected spaced-apart relationship within said housing, first and second manifold means in sealing engagement with said housing and said tubes, and means on said first and second manifolds for forcing air through said inner tubes and said housing. The diameter of said inner tubes and said housing being great enough to minimize ice blocking said tubes, and provide a high flow rate and high heat transfer area to achieve heat exchanger effectiveness of at least 40% over a length of 10 m.

Figure 2:
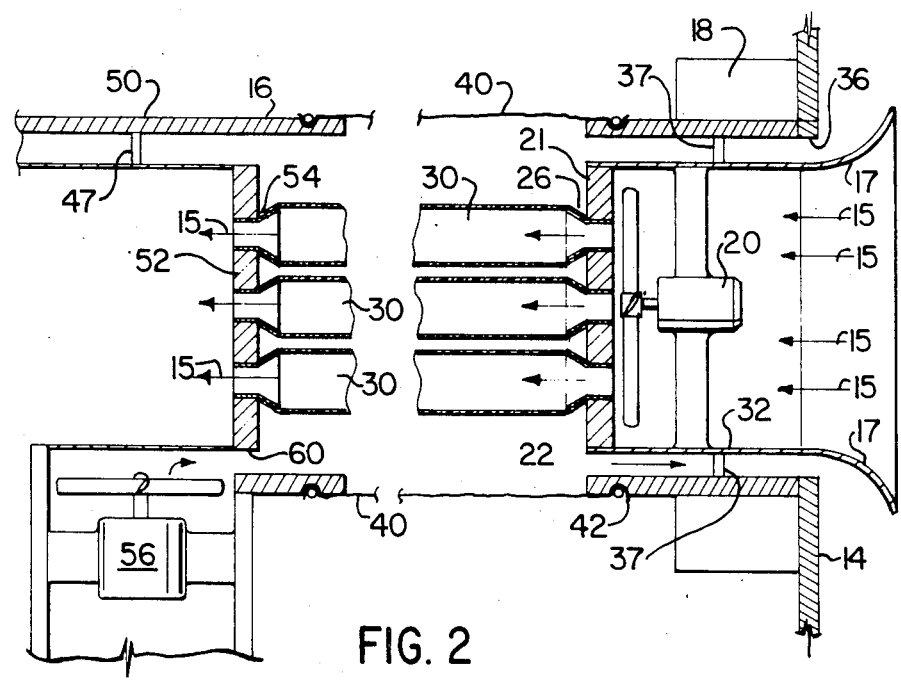
Figure 3:
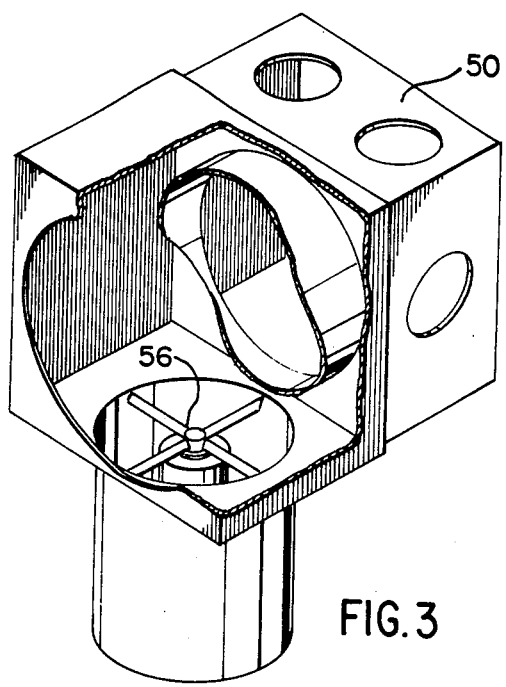
Figure 4:
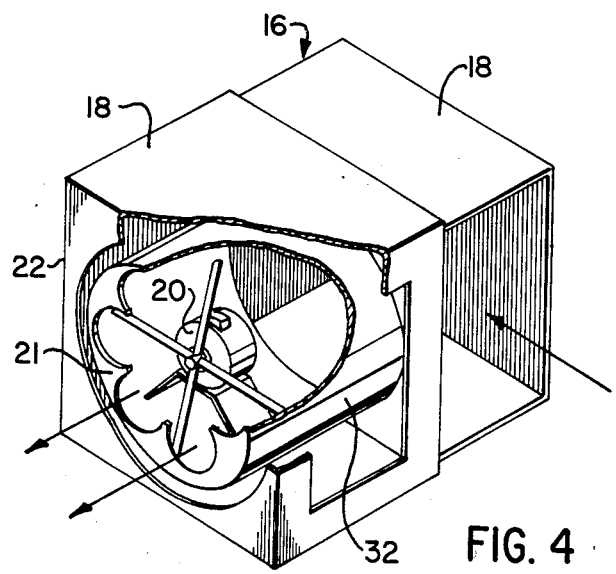
Figure 5:
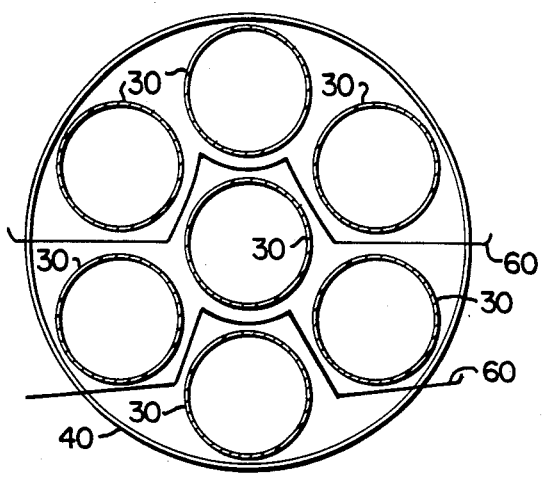
Figure 6:
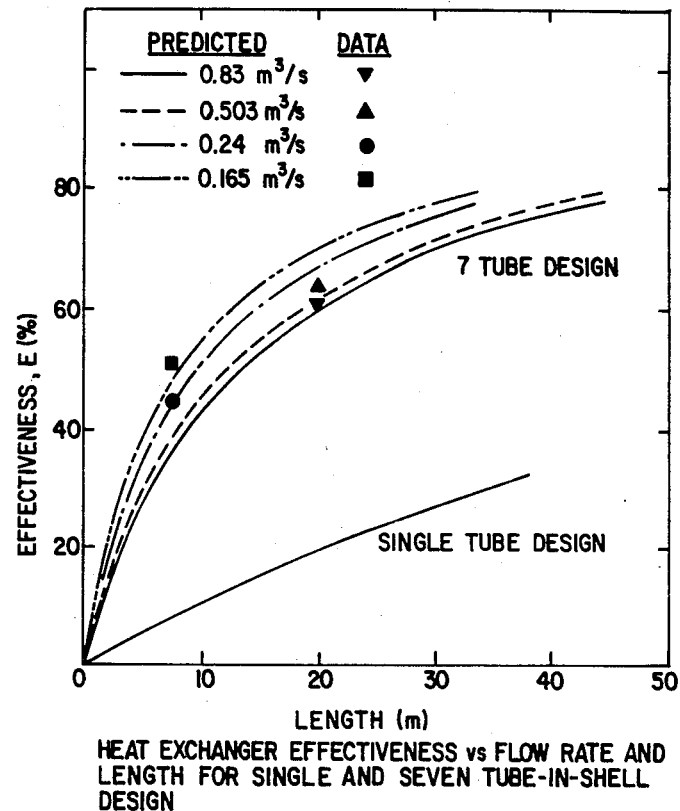

In the accompanying drawings, which illustrate a preferred embodiment of the invention, FIG. 1 is a perspective view of an air distribution system using the heat exchanger of this invention, FIG. 2 is a cross section of the heat exchanger of this invention, FIG. 3 is a cut away perspective view of the manifold at the warm end of the heat exchanger, FIG. 4 is a cut away perspective view of the manifold at the cold end of the heat exchanger, FIG. 5 is a cross-sectional view taken along the line 5—5 of FIG. 1, and FIG. 6 is a graph showing predicted and experimentally determined heat exchanger effectiveness at various flow rates, and heat exchanger lengths.

Referring now in detail to the drawings, a heat exchanger in accordance with this invention is shown generally at 10 in FIG. 1, installed in a greenhouse 12. A suitable aperture is provided in a wall 14 of the greenhouse 12 in which a cold-end manifold 16 is received. The manifold 16, shown in detail in FIGS. 2 and 4, may be constructed of sheet metal, plywood or any suitable material and consists of a box 18 in which a low horsepower electric fan 20 is mounted. A circular portion 21 of the front wall 22 of the manifold 16 has apertures to receive up to seven short tubes 26, only three of which are shown in FIG. 2. These short tubular fittings 26 have flared outer ends and thin film polyethylene tubes 30, have their adjacent ends secured to the tubular fittings as by nylon or polyester cord. A cylindrical housing 32 surrounds the fan 20 and is connected to the circular front wall portion 21, which is supported by three or more pin type spacer pieces 37 of which two are shown, leaving an annular opening 36 in the front wall 22. This opening 36 communicates with an exterior housing on the greenhouse wall 12, said housing directing exhaust air away from the incoming fresh air 15 via a deflector 17, an outer shell or housing 40 also of thin film polyethylene is secured to the cylindrical fitting 42 on the front face of the box 18 so that air surrounding the tubes 30 will exit through the annular opening 36 the greenhouse wall 14 and deflector housing 17.

At the inner or warm end of the heat exchanger 10 a second manifold 50 is provided which has an apertured wall 52 to receive up to seven tubular fittings 54, of which only three are shown, having flared ends which receive the warm ends of the thin film polyethylene tubes 30. The tubes are secured by any convenient means such as tightly wrapped nylon cord or banding tapes.

In the second, or warm end, manifold 50, a fan 56 is mounted at right angles to axis of the heat exchanger 10. The manifold is so constructed that the fan 56 forces warm exhaust air to enter from the greenhouse through the annular passage 60 while permitting fresh cold air to exit the heat exchanger 10 and to enter the greenhouse 12 from the warm ends of the inner tubes 30. The warm air passage 60 communicates with the housing 40 which is in sealing engagement with the second manifold 50. The annular passage is supported by spacing pins 47 of which three or more are required, and of which only one is shown.

The air pressure provided by the fan 20 to the tubes 30 is approximately 5 mm of water and the air pressure provided by the fan 56 to the tube 40 is approximately equal to 2.5 mm of water. The above air pressures are sufficient to keep both the inner tubes 30 and the shell of the heat exchanger 10 inflated.

However, it is necessary to support the inner tubes 30 in spaced relations as shown in FIG. 5 and this is accomplished by providing two substantially M-shaped wires 60 at 3 m intervals which can be conveniently forced through the wall of the outer or shell tube, without special tools, and usually when the tubes are inflated. Each M-shaped wire supports three tubes in a triangular array, with two such wires positioned one above the other being required to support six of the seven tubes shown in FIG. 5, the seventh tube does not need to be supported. The ends of the said wires 60 extend through the wall of the outer tube 40, are secured to supports as by nylon cords. Furthermore, the outer tube 40 is supported at 10 m intervals with the added advantage that the turbulence created by the support cords, and the slight droop of the tubes between supports, causes better exchange of heat between the incoming and outgoing air.

If icing occurs on the outer surface of the inner tubes 30, near the cold end of the heat exchanger, it tends to be self-limiting, as determined by the actual operation, in thickness due to the reduced thermal conductivity of the ice layer. The thickness of the ice buildup does not significantly influence the flow of exhaust air over the tubes 30, due to the large size of the passages.

Condensation which occurs due to the cooling of the humid exhaust air, forms on the outer surface of the tubes 30 closer to the warm end than any frost zone. The condensation falls to the bottom of the large outer tube 40 where it is drained away via small drainage holes (not specifically shown) which are creating by piercing the outer tube 40.

As shown in FIG. 5, a seven inner tube design has an almost 50% effectiveness over a 10 m length which increases to approximately 60% effectiveness at about 20 m.

The polyethylene inner tubes 30 and housing tube 40 can be constructed of commercially available low cost polyethylene or vinyl tube material, fabricated to specified dimensions using state-of-the-art extrusion techniques. The said tubes may have ultraviolet light stabilizers added to their material to increase lifetime in sunlit locations. The said tubes can be constructed from commercially clear material with ultraviolet light stabilizers, thereby blocking less light than metal tubes, a factor of great importance to greenhouse operators, since it reduces the shadow effect created by metal tubes and thereby reduces non-uniform crop growth caused by uneven light distribution.

The flow area of the inner tubes and the flow area of the shell side are chosen to be as identical as possible via the choice of tube sizes and the number of inner tubes, which for construction reasons should be limited to seven tubes and which for heat transfer area considerations should always be three or more. The actual ratio of inner tube area to shell area by, however, vary between the limits of 1:2 to 2:1, with a 1:1 ratio being the desired objective. The diameter of the shell may vary from approximately 24 inches to approximately 30 inches and contain 3 to 7 inner tubes.

The heat exchangers tested exhibited very good thermal effectiveness of 47% to 62%. This can be increased to 70% for 30 meter units, and flow rates of up to 1 $m^3/s$. The units exhibited stable operating characteristics, had reasonable fan power requirements, and were readily fabricated from low cost materials. Since the units are semi-transparent, they may be mounted on greenhouse end walls, and will not block as much light as metal units. The tubes are of low cost, and can be replaced when dirty, or when worn. Finally, the frost limiting behaviour of the heat exchangers permitted the units to be operated at high levels of thermal effectiveness for cold outside conditions without requiring a defrost cycle. Frost build-up was observed during January and February trials, but never became so thick that the shell side flow passages were obstructed. Indeed, the maximum frost thickness observed was 10 mm, which appears to be close to an equilibrium thickness for $-20°$ C. outside air temperature, and warm humid exhaust air. This is believed to be a significant observation, since the self-limiting nature of the ice layer at the cold end means that no defrost cycle is required for this type of heat exchanger. Typically, a defrost cycle operates for 10% of the time, and consumes power, thereby reducing the true effectiveness of a defrost cycle type heat exchanger.

What is claimed is:

1. An apparatus for use in exchanging heat between incoming and outgoing air in a greenhouse, said apparatus comprising a plurality of elongated nonconcentric inner tubes of flexible thin walled plastic substantially 4 to 6 mils thick, an elongated housing of thin walled flexible plastic substantially 6 to 10 mils thick enclosing said inner tubes, means for supporting said inner tubes in a selected spaced-apart relation with said housing, first manifold means in sealing engagement with said inner tubes and said housing, second manifold means in sealing engagement with said inner tubes and said housing, and means on said first and second manifolds for forcing air through said inner tubes and said housing; the diameter of said inner tubes and said housing being great enough to prevent ice blocking said tubes, and provide a high flow rate and heat exchange area to achieve heat exchange effectiveness of at least 40% over a length of 10 meters.

2. An apparatus as claimed in claim 1 wherein said inner tubes are supported in spaced relationship by hangers having substantially M-shaped configurations, the ends of which are supported by means secured to the greenhouse structure.

3. An apparatus for use in exchanging heat between incoming and outgoing air in a greenhouse said apparatus comprising a plurality of elongated nonconcentric inner tubes of thin walled flexible transparent plastic of a thickness capable of being inflated by air flowing through said tubes, an elongated housing of thin walled flexible transparent plastic of a thickness requiring that it be inflated by air flowing through said housing enclosing said inner tubes, means for supporting said inner tubes in a selected spaced apart relation within said housing, first manifold means in sealing engagement with said inner tubes and said housing, second manifold means in sealing engagement with said inner tubes and said housing and means on said first and second manifolds for forcing air through said inner tubes and said housing to cause air flow through and inflation of said tubes and said housing; the diameter of said inner tubes and said housing being great enough to prevent ice blocking said tubes, and provide a high flow rate and heat exchange area to achieve heat exchanger effectiveness of at least 40% over a length of 10 meters.

* * * * *